No. 654,645. Patented July 31, 1900.
D. C. KEILLER.
PITCHFORK.
(Application filed Apr. 27, 1900.)
(No Model.) 3 Sheets—Sheet 2.

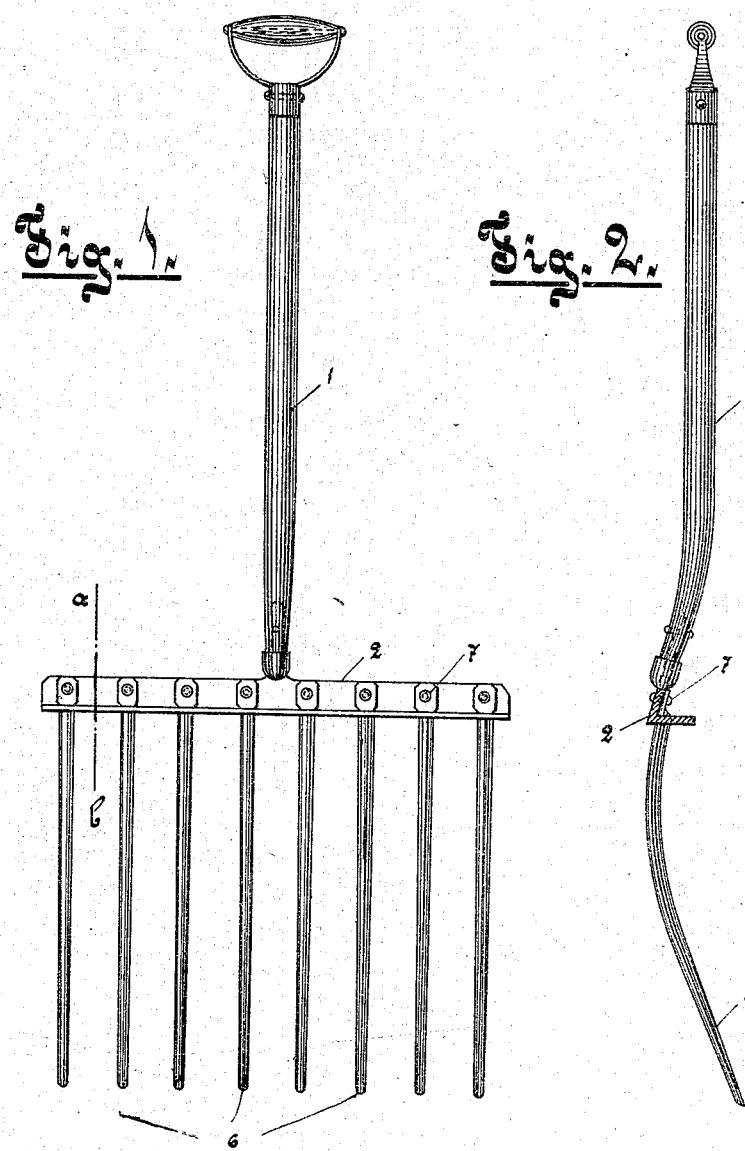

Witnesses. Inventor.
David Cable Keiller.
by
Atty.

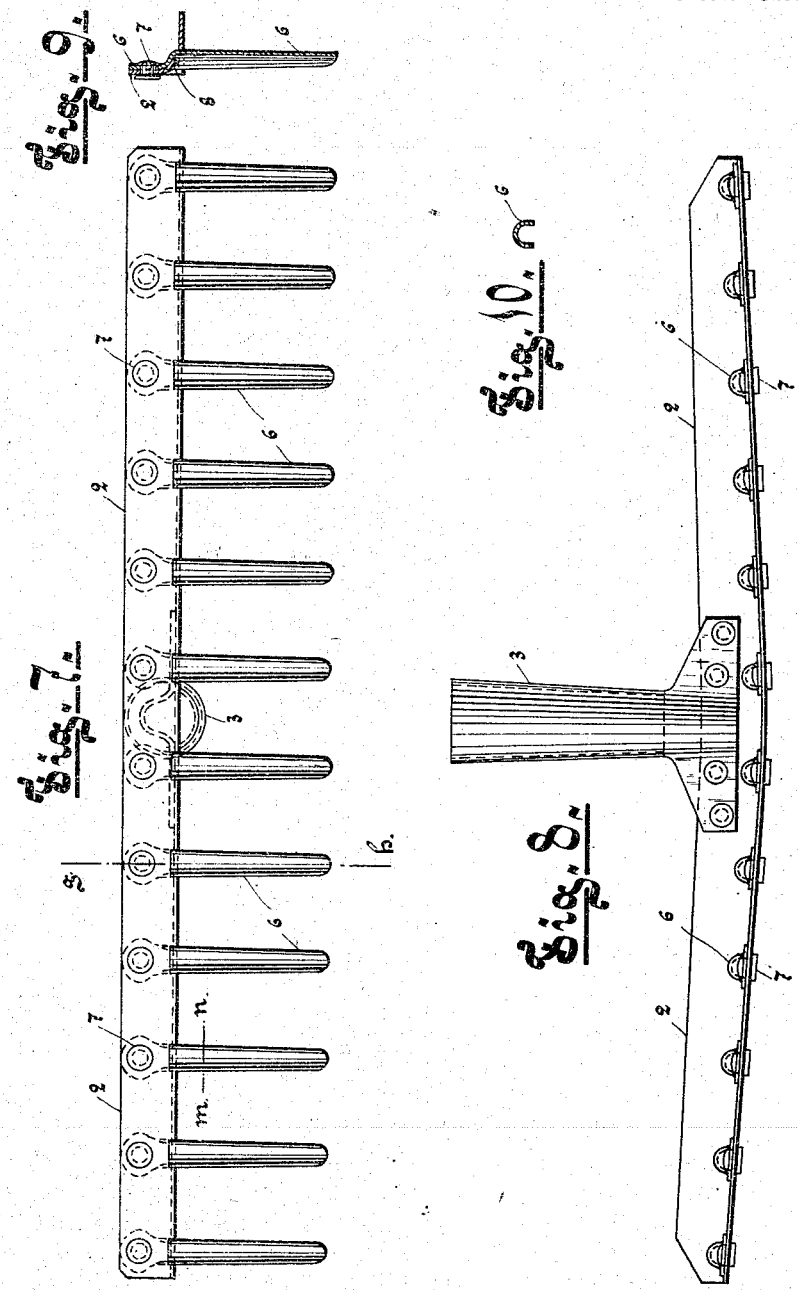

UNITED STATES PATENT OFFICE.

DAVID CABLE KEILLER, OF STOCKHOLM, SWEDEN.

PITCHFORK.

SPECIFICATION forming part of Letters Patent No. 654,645, dated July 31, 1900.

Application filed April 27, 1900. Serial No. 14,615. (No model.)

*To all whom it may concern:*

Be it known that I, DAVID CABLE KEILLER, a subject of the King of Sweden and Norway, residing at Stockholm, in the Kingdom of Sweden, have invented certain new and useful Improvements in Pitchforks and Hay-Rakes; and I do hereby declare the following to be a full, clear, and exact description of the invention, such as will enable others skilled in the art to which it appertains to make and use the same, reference being had to the accompanying drawings, and to figures of reference marked thereon, which form a part of this specification.
This invention relates to an improved construction of pitchforks and hay-rakes, its characteristic feature being the durable attachment of the tines or prongs.

The invention is shown in the accompanying drawings.

Figure 3:
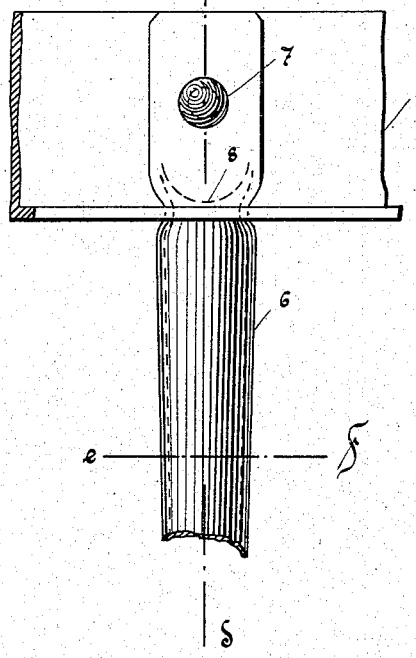
Figure 4:
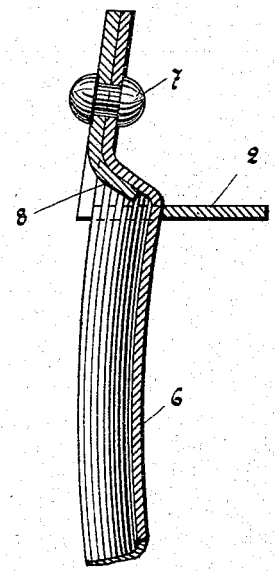
Figure 5:
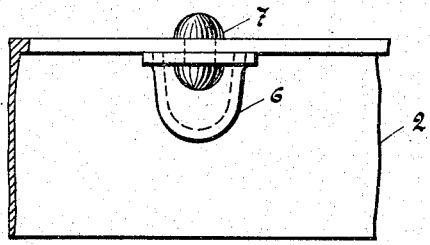
Figure 6:

Figure 1 shows a pitchfork in a front view. In Fig. 2 it is shown in a side view and in section on line *a b* of Fig. 1 viewed from the left. Fig. 3 shows a piece of a prong and a portion of the fork-head in which the former is secured, viewed as in Fig. 1, though in full size. Fig. 4 is a section on line *c d* of Fig. 3 viewed from the left. Fig. 5 shows the detail of Fig. 3 viewed from above. Fig. 6 is a cross-section of a prong on line *e f* of Fig. 3 viewed from below. Fig. 7 shows a rake in front view and constructed on the same principle as the fork, as stated above. Fig. 8 shows a top view of the rake. Fig. 9 represents a section on line *g h* of Fig. 7 viewed from the right. Fig. 10 shows a prong in cross-section on line *m n* of Fig. 7.

The head 2, Figs. 1 and 7, which consists of an angle-plate, is secured to the prongs 6 by means of rivets 7. In order to combine great strength with a minimum consumption of material, the prongs are U shaped, as shown in Figs. 6 and 10. The joint is made in the manner that the prongs are carried through holes in the horizontal bottom flange of the head, and their upper flat part is secured to the vertical upper flange of the head by means of rivets 7. The joint is exceedingly strong, owing to the fact that the portions 8 of the head 2 that are opposite the U of the prongs are bent into the U, as is evident from Figs. 4 and 9. Just below the head the edges of the prongs are bent outward, so as to better fill the holes. This is illustrated in the detail shown in Fig. 3, which in this respect can represent both the fork and the rake.

1 is the handle, and 3, Fig. 8, the socket for the handle.

I claim—

An agricultural implement such as described comprising a head made of angle-iron, a plurality of tines U-shaped in cross-section and having a flat shank secured to the vertical member of the head, the horizontal member thereof provided with slotted portions through which the tines are slipped, said vertical member having lips turned into and forming a bearing for the upper end of said tines, substantially as and for the purposes set forth.

In testimony that I claim the foregoing as my invention I have signed my name in presence of two subscribing witnesses.

DAVID CABLE KEILLER.

Witnesses:
CARL OTTO SAHLBERG,
SIGNE WETTER.